United States Patent
Kim et al.

(10) Patent No.: US 8,989,571 B2
(45) Date of Patent: Mar. 24, 2015

(54) IN-BAND SUPERVISORY DATA MODULATION USING COMPLEMENTARY POWER MODULATION

(75) Inventors: Inwoong Kim, Allen, TX (US); Olga Vassilieva, Plano, TX (US); Paparao Palacharla, Richardson, TX (US); Motoyoshi Sekiya, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 105 days.

(21) Appl. No.: 13/620,102

(22) Filed: Sep. 14, 2012

(65) Prior Publication Data

US 2014/0079390 A1 Mar. 20, 2014

(51) Int. Cl.
| H04B 10/08 | (2006.01) |
| H04B 17/00 | (2006.01) |
| H04B 10/04 | (2006.01) |
| H04B 10/12 | (2006.01) |
| H04B 10/077 | (2013.01) |

(52) U.S. Cl.
CPC ...... *H04B 10/0773* (2013.01); *H04B 2210/074* (2013.01)
USPC ............. 398/30; 398/31; 398/32; 398/183; 398/184; 398/186

(58) Field of Classification Search
CPC ...... H04B 10/67; H04B 10/69; H04B 10/505; H04B 10/532; H04B 10/541; H04B 10/548; H04B 10/613; H04B 10/614; H04B 10/2503
USPC .............. 398/30, 31, 32, 183, 184, 186
See application file for complete search history.

(56) References Cited

U.S. PATENT DOCUMENTS

| 5,430,795 | A  | * | 7/1995  | Taga et al. ............... 398/192 |
| 5,956,165 | A  |   | 9/1999  | Fee et al. |
| 6,108,113 | A  |   | 8/2000  | Fee |
| 6,678,431 | B2 | * | 1/2004  | Han et al. ................ 385/11 |
| 7,512,336 | B1 | * | 3/2009  | Meli et al. ................ 398/17 |
| 7,551,852 | B2 | * | 6/2009  | Reintjes et al. .......... 398/33 |
| 2005/0220457 | A1 | * | 10/2005 | Fujiwara et al. ......... 398/186 |
| 2008/0232816 | A1 | * | 9/2008  | Hoshida et al. .......... 398/152 |
| 2009/0028565 | A1 | * | 1/2009  | Yao ............................. 398/79 |
| 2009/0047030 | A1 | * | 2/2009  | Hoshida ..................... 398/205 |
| 2010/0142970 | A1 | * | 6/2010  | Han et al. .................. 398/152 |
| 2010/0202724 | A1 | * | 8/2010  | Little et al. ................ 385/5 |
| 2011/0150465 | A1 | * | 6/2011  | Ito .............................. 398/43 |

(Continued)

OTHER PUBLICATIONS

Feuer et al., "Digital Lightpath Label Transcoding for Dual-Polarization QPSK Systems", Optical Fiber Communication Conference, OSA Technical Digest (Optical Society of America), Mar. 2011, paper JWA028.

(Continued)

*Primary Examiner* — David Payne
*Assistant Examiner* — Pranesh Barua
(74) *Attorney, Agent, or Firm* — Maschoff Brennan

(57) ABSTRACT

According to an aspect of an embodiment, a method of modulating supervisory data onto an optical signal includes increasing a first power level of a first polarization component of an optical signal based on supervisory data. The method further includes decreasing a second power level of a second polarization component of the optical signal based on the supervisory data. The decrease in the second power level is substantially the same as the increase in the first power level such that a total power of the optical signal is substantially constant.

20 Claims, 9 Drawing Sheets

(56) References Cited

U.S. PATENT DOCUMENTS

| | | | |
|---|---|---|---|
| 2012/0134676 A1* | 5/2012 | Kikuchi | 398/65 |
| 2012/0269513 A1* | 10/2012 | Abe | 398/65 |
| 2013/0129356 A1* | 5/2013 | Tokura et al. | 398/97 |
| 2013/0170831 A1* | 7/2013 | Rahn | 398/29 |
| 2013/0216239 A1* | 8/2013 | Zhang et al. | 398/202 |

OTHER PUBLICATIONS

Tanimura et al., "Superimposition and Detection of Frequency Modulated Tone for Light Path Tracing Employing Digital Signal Processing and Optical Filter", Optical Fiber Communication Conference and Exposition (OFC/NFOEC), 2012 and the National Fiber Optic Engineers Conference, Mar. 2012, pp. 1-3.

Faruk et al., "Multi-impairment monitoring from adaptive finite-impulse-response filters in a digital coherent receiver", Optics Express, Dec. 2010, vol. 18, Issue 26, pp. 26929-26936.

Tanimura et al., "In-band FSK Supervisory Signaling between Adaptive Optical Transceivers Employing Digital Signal Processing", in 37th European Conference and Exposition on Optical Communications, OSA Technical Digest (Optical Society of America), Jul. 2011, paper We.7.A.6.

* cited by examiner

IN-BAND SUPERVISORY DATA MODULATION USING COMPLEMENTARY POWER MODULATION

FIELD

The embodiments discussed herein are related to in-band modulation of supervisory data in optical communication networks.

BACKGROUND

Telecommunications systems, cable television systems and data communication networks use optical networks to rapidly convey large amounts of information between remote points. In an optical network, information is conveyed in the form of optical signals through optical fibers or other optical media. The optical networks may include various components such as amplifiers, dispersion compensators, multi-plexer/demultiplexer filters, wavelength selective switches, couplers, etc. configured to perform various operations within the optical network. The optical network may communicate supervisory data indicating any number of characteristics associated with the optical network, including source information, destination information and routing information, and other management information of the optical network.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of modulating supervisory data onto an optical signal includes increasing a first power level of a first polarization component of an optical signal based on supervisory data. The method further includes decreasing a second power level of a second polarization component of the optical signal based on the supervisory data. The decrease in the second power level is substantially the same as the increase in the first power level such that total power of the optical signal is substantially constant.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Embodiments of the present disclosure will be explained with reference to the accompanying drawings.

Figure 1A:
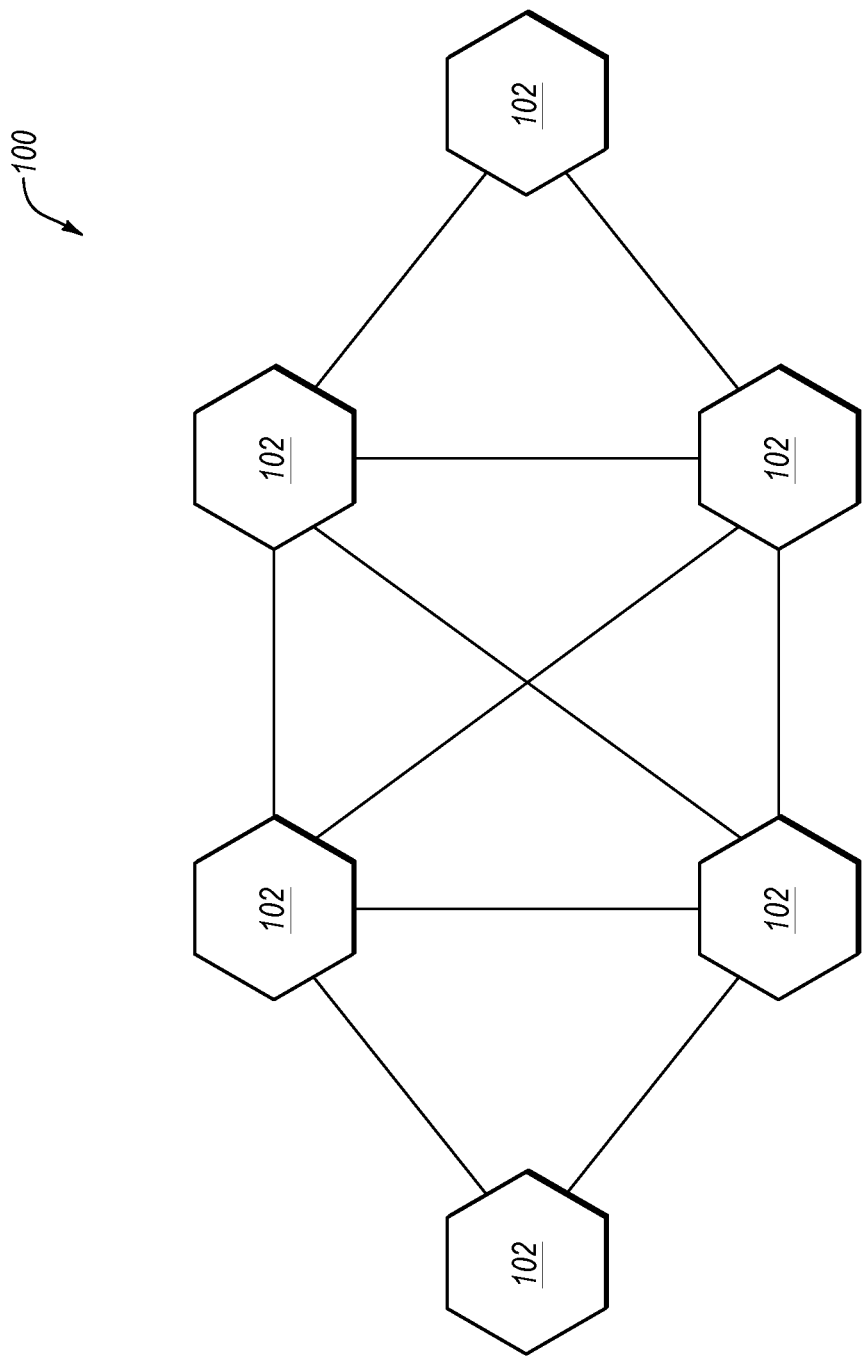
FIG. 1A illustrates an example embodiment of an optical network.

FIG. 1A illustrates an example embodiment of an optical network 100, arranged in accordance with at least some embodiments of the present disclosure. In general, the optical network 100 may be configured to communicate supervisory data within the same wavelength band or channel used to carry main data of the optical network, which may be referred to as "in-band supervisory signaling". The supervisory data may include information associated with management of the optical network 100 including, but not limited to, source information, destination information and routing information, and other management information of the optical network. In some embodiments the supervisory data may be used to detect routing errors of optical signals within the optical network 100.

As described in further detail below, the optical network 100 may perform in-band supervisory data modulation through control channel modulation of supervisory data onto an optical signal also carrying main data at a relatively high-speed symbol rate (e.g., a rate greater than several Gigabaud (Gbaud) in some embodiments) as compared to a symbol rate of the supervisory data (e.g., a rate less than tens of mega baud (Mbaud) in some embodiments). One or more nodes 102 of the optical network 100 may be configured to modulate the supervisory data without using overhead space associated with the main data. Additionally, the in-band supervisory data modulation may be performed with little to no variation of the power of the optical signal, and with little to no effect on the supervisory data due to drift of phase and/or frequency of a laser of an optical transmitter of a node 102 that generates the optical signal.

The in-band supervisory data modulation may be implemented in the optical domain or the electrical domain. When implemented in the optical domain, one or more "additional" optical components may be provided to accomplish the in-band supervisory data modulation at the optical transmitters of the nodes 102, which optical components are not provided in embodiments in which the in-band supervisory data modulation is implemented in the electrical domain. Analogously, one or more receivers of the nodes 102 of the optical network 100 may be configured to demodulate the supervisory data in the optical domain or in the electrical domain. In the same or other embodiments, as described in further detail below, a supervisory data detector ("SV detector") of one or more of the nodes 102 may be configured to demodulate the supervisory data. When implemented in the electrical domain, one or more "additional" optical components used to demodulate the supervisory data in the optical domain may be omitted.

In the illustrated embodiment, the optical network 100 is depicted as mesh optical network. However, the optical network 100 may be any suitable optical network including a point-to-point optical network with terminal nodes, a ring optical network, a mesh optical network, or any other suitable optical network or combination of optical networks.

The nodes 102 may be configured to communicate information to each other via optical signals carried by optical fibers. The optical signals may be generated by modulating one or more beams of light with the information such that the beams of light act as carrier waves (also referred to as "carriers") of the information. Any suitable modulation scheme may be used to encode the information including, but not limited to, any suitable polarization multiplexed or dual-polarization modulation scheme such as a dual-polarization (DP) modulation scheme that may include a dual-polarization quadrature phase-shift keying (DP-QPSK) modulation scheme, a DP-8PSK modulation scheme, a DP-16PSK modulation scheme, or any applicable dual-polarization quadrature amplitude modulation (DP-QAM) scheme (e.g., DP-QAM, DP-8QAM, DP-16QAM, etc.).

The information modulated onto each beam of light may include main data and supervisory data. Main data may include customer data or other data transmitted through the optical network 100 for use by users of the optical network 100, for example. As previously mentioned, the supervisory data may include information associated with management of the optical network 100, examples of which are provided above. As described in detail below with respect to FIGS. 2-5, one or more of the optical transmitters of the nodes 102 may be configured to modulate supervisory data onto an optical signal such that the symbol rate of the supervisory data is relatively slow compared to the symbol rate of the main data. The relatively low-speed supervisory data symbol rate may allow for in-band transmission of the supervisory data on the optical signal with little to no interference with the main data also transmitted on the optical signal.

Figure 1B:
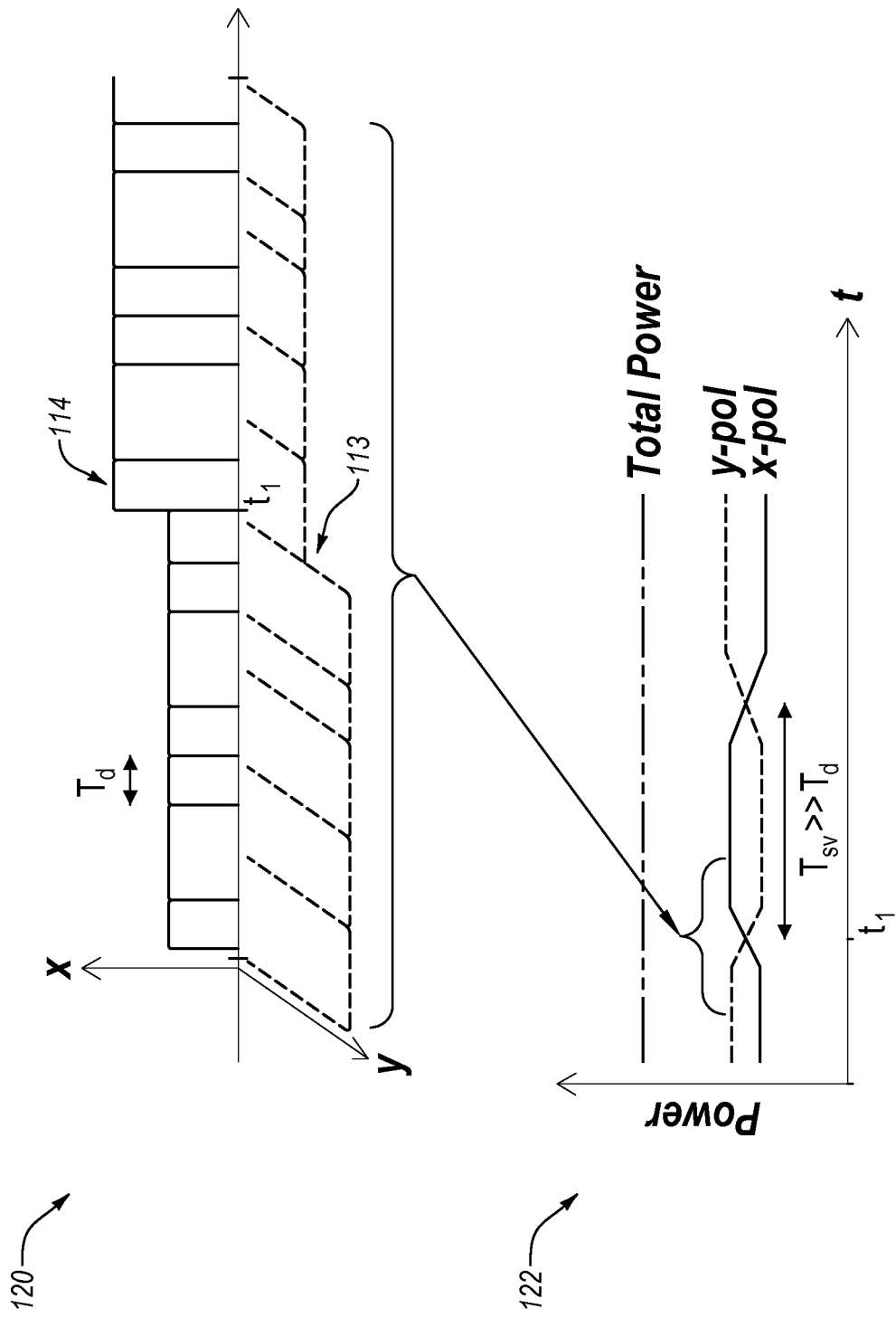
FIG. 1B illustrates example graphs depicting complementary power modulation.

The low-speed, in-band modulation may be done using one or more modulation schemes including complementary power modulation between orthogonal polarization components (also referred to as "complementary power modulation" and described with respect to FIG. 1B). As discussed in detail below with respect to FIGS. 2-5, one or more optical transmitters may be configured to modulate the supervisory data in the electrical domain in some embodiments and, in alternative embodiments, may be configured to modulate the supervisory data in the optical domain.

FIG. 1B illustrates example graphs 120 and 122 depicting complementary power modulation, arranged in accordance with at least some embodiments of the present disclosure. For complementary power modulation of supervisory data, the supervisory data may be modulated on an optical signal at a relatively slow symbol rate (as compared to the symbol rate of the main data modulated on the optical signal) by varying the power of components of the optical signal having orthogonal polarization orientations (e.g., a component having an X-polarization and a component having a Y-polarization) based on the supervisory data. Any increase or decrease in power of a signal associated with one polarization component may correspond with a respective decrease or increase in power of the signal associated with the orthogonal polarization component. Accordingly, the overall power of the optical signal may be substantially constant.

For example, as depicted in the graphs 120 and 122 of FIG. 1B, at a time before time $t_1$, a Y-polarization component 113 of an optical signal may have a higher power level than an X-polarization component 114 of the optical signal based on supervisory data modulated thereon. At time $t_1$, the power of the X-polarization component 114 may be incremented and the power of the Y-polarization signal 113 may be decremented according to a change in the supervisory data. Accordingly, FIG. 1B illustrates how supervisory data may be modulated onto the optical signal by changing the power levels of the orthogonally polarized components of the optical signal. Additionally, as illustrated by the graphs 120 and 122, the power of the X-polarization component 113 may be incremented to the same degree as the decrement in power of the Y-polarization signal 114 at time $t_1$. Accordingly, an overall power (identified as "Total Power" in FIG. 1B) of the optical signal may be substantially constant, as depicted in the graph 122.

Additionally, the supervisory data may have a modulation rate associated with a supervisory data symbol period of $T_{sv}$ and the main data may have a modulation rate associated with a main data symbol period of $T_d$. As illustrated by the graphs 120 and 122, the supervisory data symbol period $T_{sv}$ may be substantially longer than the main data symbol period $T_d$ due to the relatively slow in-band supervisory data modulation rate (as compared to the main data symbol rate). Because of the slow complementary power modulation, a modulation depth in each polarization component may be relatively small such that the modulation depth may cause little to no degradation to the performance of the main data. Accordingly, such an embodiment may allow for in-band transmission of the supervisory data on the optical signal with little to no interference with the main data also being transmitted on the optical signal.

Modifications, additions, or omissions may be made to the embodiment of complementary power modulation described with respect to FIG. 1B without departing from the scope of the present disclosure. For example, the graphs 120 and 122 are merely conceptual depictions of complementary power modulation. The actual degree of increase and decrease in the power of the different components associated with orthogonal polarization orientations of an optical signal may vary according to particular design constraints and considerations. Additionally, the orientations and labels of the X-polarization component 114 and the Y-polarization component 113 are merely to show that the polarization orientations of the two components are substantially orthogonal to each other. The actual orientation of the two orthogonal X and Y polarization components may vary.

Returning to FIG. 1A, as mentioned above, one or more of the nodes 102 may include one or more receivers and/or SV detectors configured to demodulate supervisory data modulated onto the optical signal using complementary power modulation, such as has been described above. Accordingly, one or more of the receivers may include a coherent optical receiver configured to demodulate and extract the supervisory data from an optical signal (described with respect to FIG. 6). In the same or alternative embodiments, one or more SV detectors may include a tunable filter, a polarimeter and a signal processor configured to receive a tapped signal of the optical signal and separate orthogonal polarization components from the tapped signal such that the supervisory data may be detected and extracted from the tapped signal (described in detail with respect to FIG. 7). In some embodiments, the SV detector may be included with an optical receiver and in other embodiments, the SV detector may be separate from an optical receiver.

Therefore, the optical network 100 may be configured to modulate supervisory data at a relatively slow symbol rate onto an optical signal also carrying main data at a relatively fast symbol rate as compared to the supervisory data symbol rate. Such a configuration: (1) may allow for low speed detection of the supervisory data; (2) may not involve additional optical components (in some embodiments) for in-band supervisory data modulation, transmission, and demodulation; (3) may not use overhead associated with the main data; (4) may have little to no interference between the supervisory data and the main data transmitted on the same optical signal; and/or (5) may generate little to no variation in the total power of the optical signal.

Modifications, additions or omissions may be made to the optical network 100 without departing from the scope of the present disclosure. For example, the optical network 100 may include more or fewer nodes 102 than those depicted. Additionally the each node 102 may have a wide variety of functionality. Also, as mentioned above, although depicted as a mesh optical network, the optical network 100 may be any suitable optical network for transmitting optical signals such as a ring or point-to-point optical network.

Figure 2:
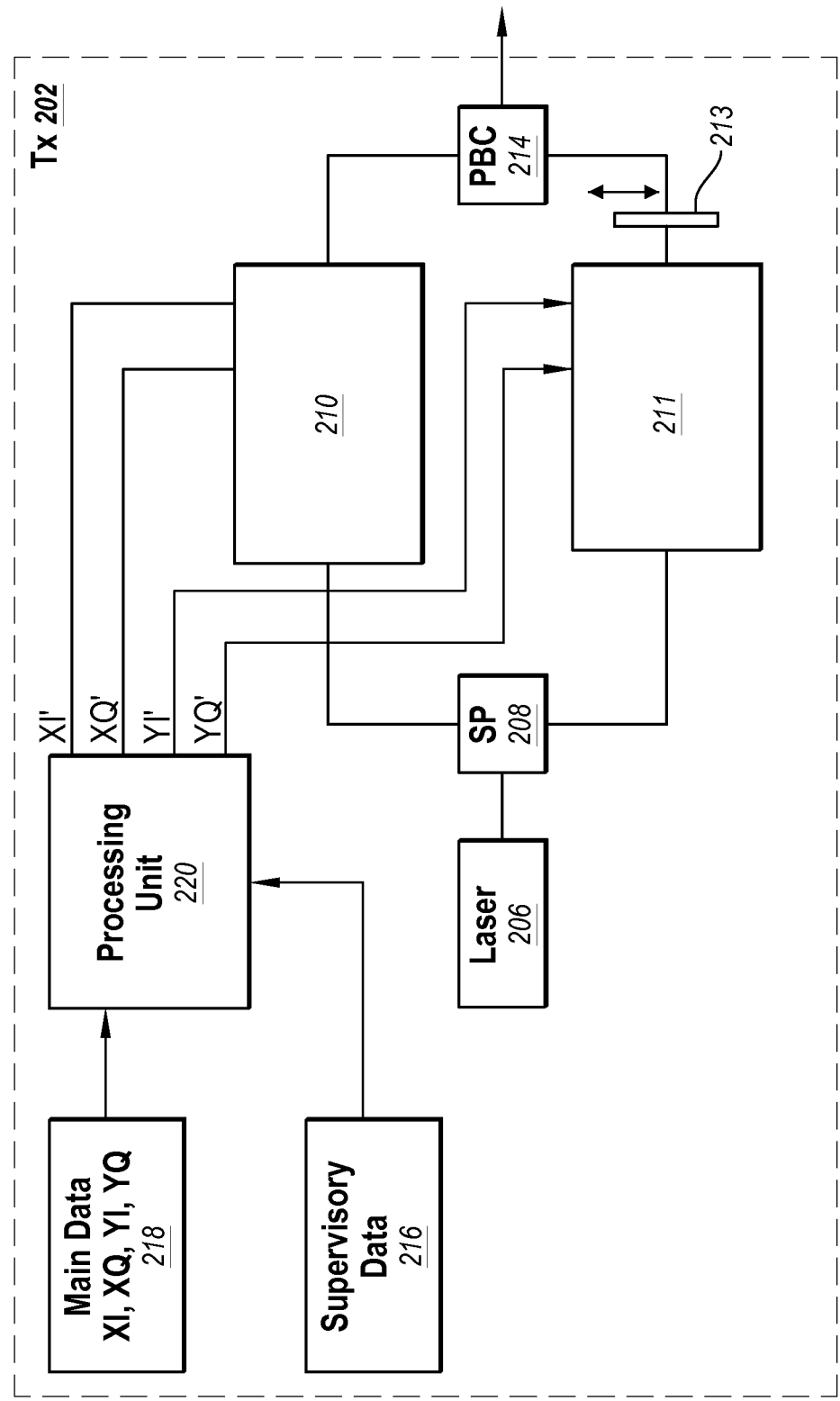
FIG. 2 illustrates an example embodiment of an optical transmitter configured to modulate supervisory data for an optical signal in the electrical domain.

As mentioned above, an optical transmitter may be configured to modulate supervisory data for an optical signal in the electrical domain prior to generating the optical signal. FIG. 2 illustrates an example embodiment of an optical transmitter 202 configured to modulate supervisory data for an optical signal in the electrical domain, arranged in accordance with at least some embodiments of the present disclosure. One or more of the nodes 102 of FIG. 1A may include one or more of the optical transmitter 202, for example. In the illustrated embodiment, the optical transmitter 202 may be configured to perform DP-QPSK modulation. However, the same principles for performing in-band supervisory data modulation described below may apply with respect to any optical transmitter configured to perform any applicable polarization multiplexed or dual-polarization modulation scheme.

The optical transmitter 202 may include a laser 206 or other optical signal source configured to generate a beam of light within a particular wavelength range associated with a channel. In some embodiments, the laser 206 may be tunable across one or more wavelength ranges which may or may not be associated with one or more wavelength ranges. The beam of light generated by the laser 206 may be directed toward a splitter (SP) 208 that may split the beam of light into two beams that may act as carriers. The splitter 208 may direct one of the beams toward an optical I (in-phase) Q (quadrature-phase) modulator (referred to hereinafter as "IQ modulator") 210. The splitter 208 may direct the other beam toward an IQ modulator 211.

The IQ modulator 210 may be configured to modulate data associated with an electrical driving signal XI' (explained in further detail below) and an electrical driving signal XQ' (explained in further detail below) onto the beam received by the IQ modulator 210 to generate a first polarization component of a dual polarization (or polarization multiplexed) optical signal. Similarly, the IQ modulator 211 may be configured to modulate data associated with an electrical driving signal YI' (explained in further detail below) and an electrical driving signal YQ' (explained in further detail below) onto the beam received by the IQ modulator 211 to generate a second polarization component of the dual polarization (or polarization multiplexed) optical signal.

In the illustrated embodiment, the second polarization component may be directed toward a half-wave plate 213. The half-wave plate 213 may be configured to rotate the polarization of the second polarization component according to the DP-QPSK modulation scheme such that the polarization of the second polarization component may be substantially orthogonal to the polarization of the first polarization component. In the illustrated embodiment, the rotated second polarization component having data modulated thereon may have a Y-polarization orientation and may be referred to as a Y-polarization signal. The first polarization component with a polarization orthogonal to the Y-polarization signal and having data modulated thereon may accordingly have an X-polarization orientation and may be referred to as an X-polarization signal. The X and Y polarization signals may be directed toward a polarization beam combiner (PBC) 214.

The PBC 214 may include any system, apparatus, or device configured to combine the X and Y polarization signals into a single optical signal with a carrier that includes both the X and Y polarization signals. Consequently, the beam of light leaving the PBC 214 may include an optical signal with X and Y polarization components that may respectively include the X and Y polarization signals. In the same or alternative embodiments, the modulated X and Y polarization signals may each be directed toward a return to zero (RZ) pulse carver (not expressly shown in FIG. 2) before being directed toward the PBC 214. In yet other embodiments, the RZ pulse carver may be included in the optical transmitter 202 before the splitter 208.

The electrical driving signals XQ', XI', YQ', and YI' may include main data 218 integrated with supervisory (SV) data 216. In the illustrated embodiment, the main data 218 may include X-polarization data, including in-phase X-polarization data (XI) and quadrature X-polarization data (XQ), as well as Y-polarization data, including in-phase Y-polarization data (YI) and quadrature Y-polarization data (YQ) in accordance with a DP-QPSK modulation scheme.

A processing unit 220 of the optical transmitter 202 may be configured to integrate the supervisory data 216 with the main data 218 that includes the X and Y polarization data, including XI, XQ, YI, and YQ, to generate driving signals XQ', XI', YQ', and YI' that include both the main data 218 and the supervisory data 216. The IQ modulator 210 may modulate driving signals XQ' and XI' onto the beam received by the IQ modulator 210 and The IQ modulator 211 may modulate driving signals YQ' and YI' onto the beam received by the IQ modulator 211 as described above.

The processing unit 220 may include any suitable system, apparatus, or device configured to perform operations of the processing unit 220, as described below. For example, the processing unit 220 may include a processor and one or more computer-readable storage media communicatively coupled to the processor. The one or more computer-readable storage media may include instructions for performing the operations of the processing unit 220 that may be read by the processor of the processing unit 220. Alternately or additionally, the processing unit 220 may include or be coupled to a digital-to-analog converter (DAC) such that a signal received by each of the IQ modulators 210 and 211 includes an analog signal.

In some embodiments of the present disclosure, the processing unit 220 may be configured to integrate the supervisory data 216 with the main data 218 such that the modulation of the supervisory data 216 onto an optical signal carrying main data 218 (as generated and emitted by the optical transmitter 202) is manifested as complementary power modulation, explained above with respect to FIG. 1B. For example, the processing unit 220 may be configured to perform operations to X and Y polarization data (e.g., XI, XQ, YI, and YQ) associated with the main data 218 with respect to the supervisory data 216 ($d_s(t)$) as a function of time to generate driving signals XI', XQ', YI', and YQ' that manifest complementary power modulation of supervisory data 216 based on the following equations:

$$XQ'=(1-ad_s(t))XQ, XI'=(1-ad_s(t))XI; \text{ and}$$

$$YQ'=(1-a(1-d_s(t)))YQ, YI'=(1-a(1-d_s(t)))YI;$$

where a may include a constant that determines the modulation depth of the supervisory signal and $a^2$ may be substantially less than one (e.g., $a^2 \ll 1$). Based on these equations, the optical power of the X-polarization ($P_x$) and the Y-polarization ($P_y$) of the optical signal may be proportional to:

$$P_x \propto |XQ'+iXQ'|^2/|XI+iXQ|^2 \approx 1-2ad_s(t) \text{ where } a^2 \ll 1;$$
and $$P_y \propto |YI'+iYQ'|^2/|YI+iYQ|^2 \approx -2a(1-d_s(t)) \text{ where } a^2 \ll 1$$

In some embodiments, the supervisory data may be modulated onto a pilot tone supervisory carrier using phase-shift keying (PSK) such as in the description below. The supervisory carrier wave may have a carrier frequency of $f_s$, which may be less than tens of MHz in some examples. In such embodiments XI', XQ', YI', and YQ' may be generated based on the following equations:

$$XI'=[1+a\cos(2\pi f_s t+\pi d_s(t))]XI, XQ'=[1+a\cos(2\pi f_s t+\pi d_s(t))]XQ$$

$$YI'=[1-a\cos(2\pi f_s t+\pi d_s(t))]XI, YQ'=[1-a\cos(2\pi f_s t+\pi d_s(t))]XQ$$

In the above equations associated with a carrier frequency of the supervisory signal, the average optical power $P_x$ and $P_y$, respectively, of the X-polarization and the Y-polarization of the optical signal may be proportional to:

$$P_x \propto 1+2a\cos(2\pi f_s t+\pi d_s(t)); \text{ where } a^2 \ll 1; \text{ and}$$

$$P_y \propto 1-2a\cos(2\pi f_s t+\pi d_s(t)); \text{ where } a^2 \ll 1.$$

The total power of the optical signal for instances when (1) there is a supervisory carrier wave and (2) when there is not a supervisory carrier wave may equal the sum of $P_x$ and $P_y$ and may be substantially constant for both cases.

As described above, the IQ modulators 210 and 211 may modulate driving signals XI', XQ', YI', and YQ' onto carriers associated with the optical signal. Therefore, the processing unit 220 may perform the above operations in the electrical domain that manifest as complementary power modulation of supervisory data 216 onto an optical signal.

Accordingly, the optical transmitter 202 may be configured to generate an optical signal that includes the main data 218 and the supervisory data 216 for transmission in an optical network (e.g., the optical network 100 of FIG. 1). As described above, the optical transmitter 202 may modulate the supervisory data 216 in the electrical domain such that complementary power modulation of the supervisory data 216 on the optical signal is manifested. Accordingly, the optical transmitter 202 may modulate the supervisory data 216 onto the optical signal without the addition of optical components, which may reduce the cost and/or complexity of implementing the above described modulations.

Modifications, additions, or omissions may be made to the optical transmitter 202 without departing from the scope of the present disclosure. For example, the optical transmitter 202 is described and illustrated as performing DP-QPSK modulation. However, the above described modulation of supervisory data 216 may be performed with any optical transmitter that may transmit an applicable polarization multiplexed or dual-polarization optical signal. Additionally, although the modulation of the supervisory data 216 is described as being performed in the electrical domain, an optical transmitter similar to the optical transmitter 202 may be configured to perform complementary power modulation of supervisory data 216 in the optical domain.

For example, FIGS. 3-5 described below illustrate example embodiments of optical transmitters 302, 402, 502 configured to perform complementary power modulation of supervisory data 316, 416, 516 onto an optical signal in the optical domain, as explained below. One or more of the optical transmitters of the nodes 102 of FIG. 1A may be implemented as any of the optical transmitters 302, 402, 502 of FIGS. 3-5, for example.

Figure 3:
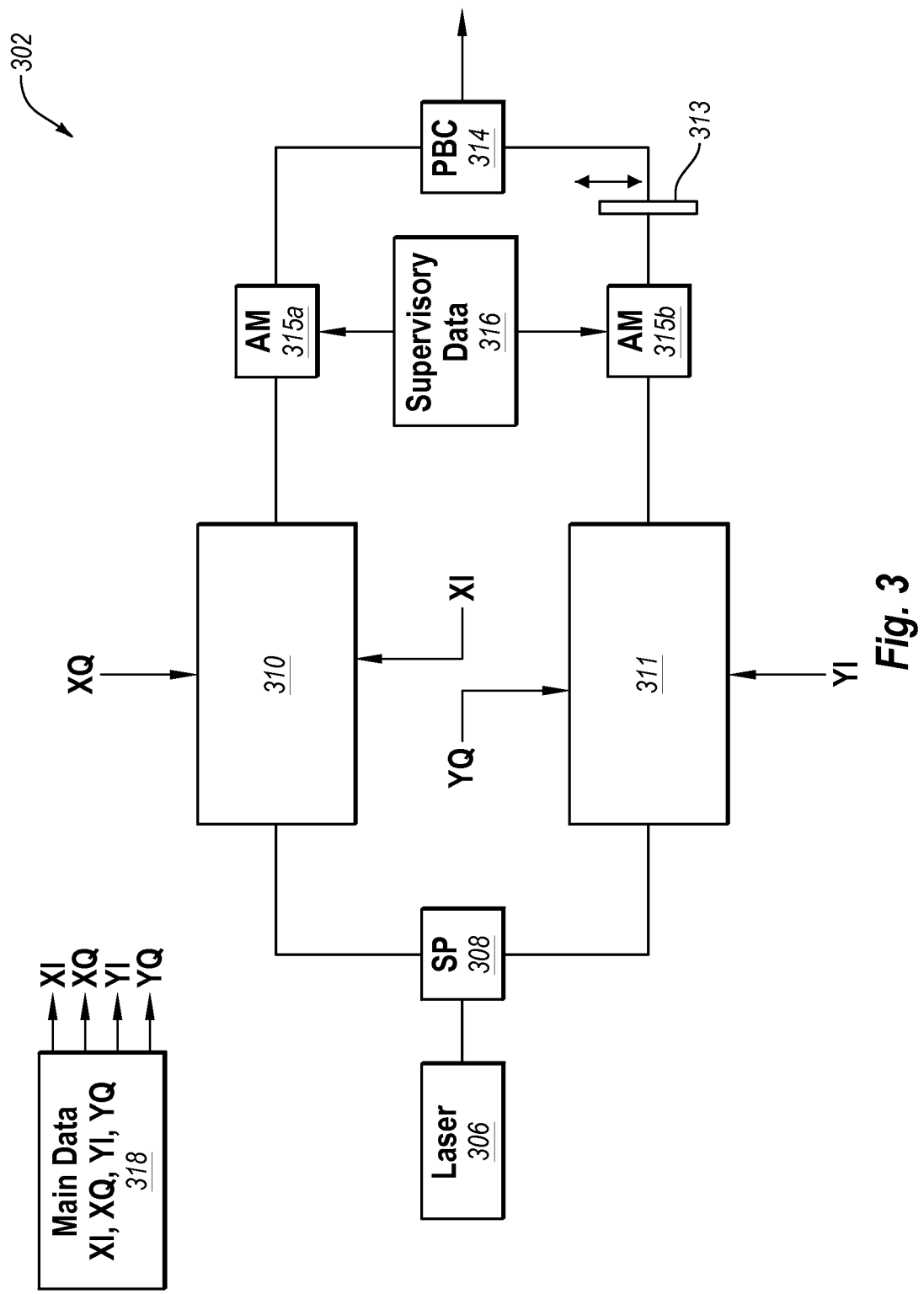
FIG. 3 illustrates an example embodiment of an optical transmitter configured to perform complementary power modulation in the optical domain.

FIG. 3 illustrates an example embodiment of an optical transmitter 302 configured to perform complementary power modulation of supervisory data 316 in the optical domain, arranged in accordance with at least some embodiments of the present disclosure. In the illustrated embodiment, the optical transmitter 302 may be configured to perform DP-QPSK modulation. More generally, the implementation of complementary power modulation described with respect to FIG. 3 may be implemented with respect to any optical transmitter configured to perform any applicable polarization multiplexed or dual-polarization modulation.

The optical transmitter 302 of FIG. 3 may include a laser 306, a splitter (SP) 308, IQ modulators 310 and 311, a half-wave plate 313 and a PBC 314 substantially similar in operation and arrangement as the laser 206, the splitter 208, the IQ modulators 210 and 211, the half-wave plate 213, and the PBC 214, respectively, described above with respect to FIG. 2. However, as described below, the optical transmitter 302 may be configured to perform complementary power modulation of supervisory data 316 in the optical domain and not in the electrical domain.

The IQ modulators 310 and 311 may be configured to modulate main data 318, including XI, XQ, YI, and YQ, onto the respective carriers received by the IQ modulators 310 and 311. For example, the IQ modulator 310 may modulate X-polarization data, XI and XQ, on the carrier received by the IQ modulator 310 from the splitter 308. Additionally, the IQ modulator 311 may modulate Y-polarization data, YI and YQ, on the carrier received by the IQ modulator 311 from the splitter 308. A resulting first polarization component leaving the IQ modulator 310 and modulated with X-polarization data may be directed toward an amplitude modulator (AM) 315a. Similarly, a resulting second polarization component leaving the IQ modulator 311 and modulated with Y-polarization data may be directed toward an amplitude modulator 315b.

The amplitude modulators 315a and 315b may be configured to receive the supervisory data 316 and modulate the supervisory data 316 onto the respective first and second polarization components by adjusting the power (i.e., amplitude) of the respective first and second polarization components. The amplitude modulators 315a and 315b may be configured such that when modulating the supervisory data 316 onto the respective first and second polarization components, an increase in the power of one polarization component may be complemented by a substantially equal decrease in the power of the other polarization component. Therefore, the overall power of the optical signal leaving the optical transmitter 302 may be substantially constant.

For example, the complementary power modulation may be configured such that a digital "1" associated with supervisory data 316 may be indicated by an increase in power of the X-polarization of an optical signal and a decrease in the power of the Y-polarization of the optical signal, or vice versa. As such, for a digital "1" associated with supervisory data 316, the amplitude modulator 315a may be configured to increase the power of the first polarization component (which may have an X-polarization) and the amplitude modulator 315b may be configured to decrease the power of the second polarization component (which may have a Y-polarization after passing through the half-wave plate 313) to substantially the same degree as the increase in power provided by the amplitude modulator 315a in some embodiments.

Similarly, the complementary power modulation may be configured such that a digital "0" associated with supervisory data 316 may be indicated by a decrease in power of the X-polarization of an optical signal and an increase in the power of the Y-polarization of the optical signal, or vice versa. As such, for a digital "0" associated with supervisory data 316, the amplitude modulator 315a may be configured to decrease the power of the first polarization component (which may have an X-polarization) and amplitude modulator 315b may be configured to increase the power of the second polarization component (which may have a Y-polarization after passing through the half-wave plate 313) to substantially the same degree as the decrease in power provided by amplitude modulator 315a in some embodiments.

Similarly as described above with respect to the supervisory data 216 of FIG. 2, the modulation rate of the supervisory data 316 may be substantially slower than the modulation rate of main data 318. Additionally, the modulation depth of the supervisory data may be sufficiently small because of the slow modulation rate such that the main data may not be substantially affected. Therefore, the transmission of the supervisory data 316 on the optical signal may cause little to no interference with the transmission of the main data 318 on the optical signal.

The amplitude modulator 315a may be configured to direct the first polarization component modulated with both supervisory data 316 and X-polarization data to the PBC 314. Similar to as described above with respect to FIG. 2, the first polarization component modulated with the X-polarization data and supervisory data 316 may have an X-polarization and may be referred to as an X-polarization signal.

The amplitude modulator 315b may be configured to direct the second polarization component modulated with both supervisory data 316 and Y-polarization data toward the half-wave plate 313. The half-wave plate 313 may rotate the polarization of the received second polarization component to give the received second polarization component a Y-polarization such that the rotated and modulated second polarization component may be referred to as a Y-polarization signal, similar to as described above with respect to FIG. 2. The half-wave plate 313 may direct the Y-polarization signal to the PBC 314. The PBC 314 may combine the X and Y polarization signals into a single optical signal for transmission over an optical network. Therefore, the optical signal transmitted by the optical transmitter 302 may include supervisory data 316 modulated using complementary power modulation and main data 318 modulated using DP-QPSK modulation.

Modifications, additions, or omissions may be made to FIG. 3 without departing from the scope of the present disclosure. For example, the optical transmitter 302 may include other components not expressly shown (e.g., a processing unit configured to control various operations of the optical transmitter 302). Additionally, although described in the context of performing DP-QPSK modulation, the optical transmitter 302 may be configured to perform complementary power modulation on any suitable polarization multiplexed or dual-polarization optical signal.

Figure 4:
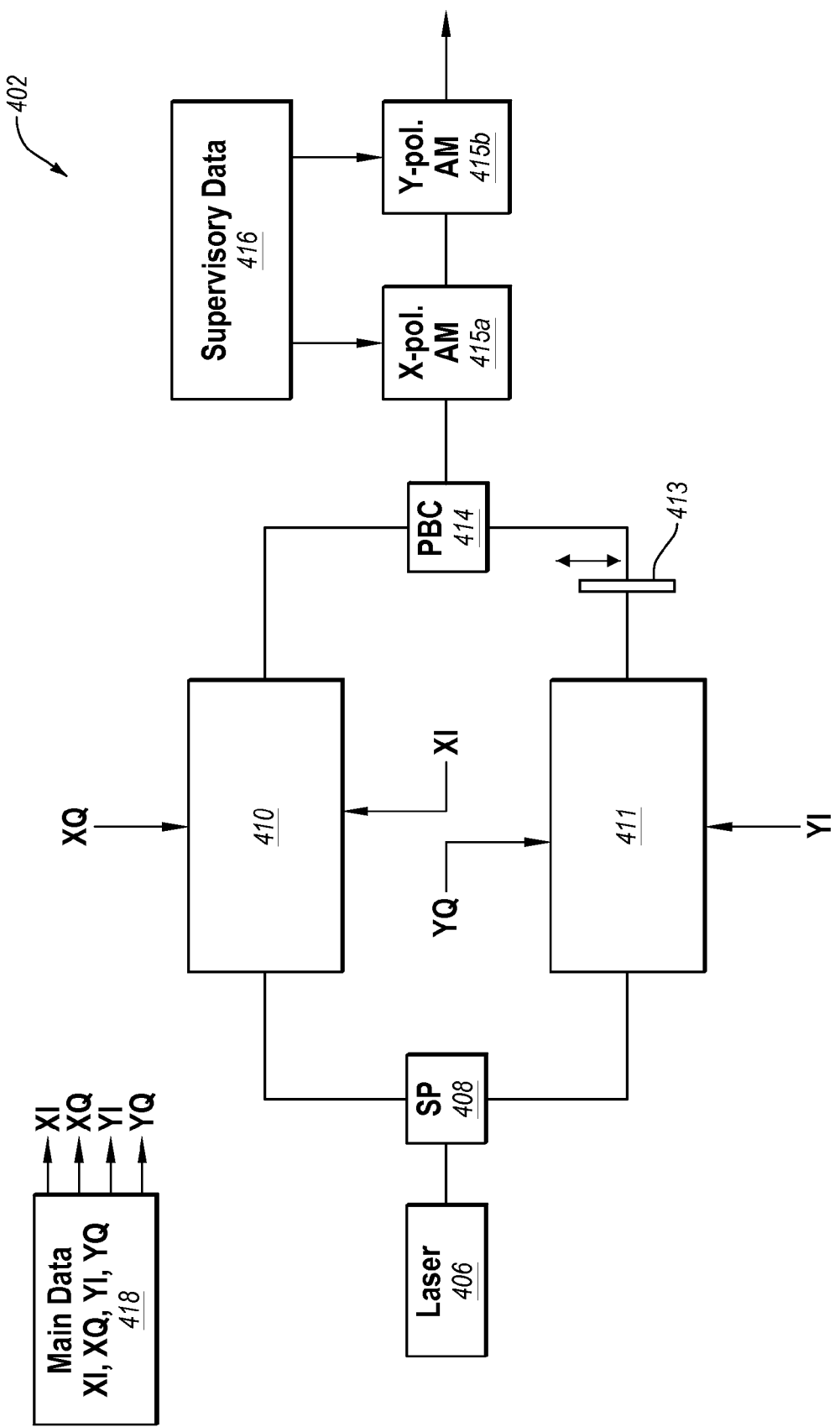
FIG. 4 illustrates another example embodiment of an optical transmitter configured to perform complementary power modulation in the optical domain.

FIG. 4 illustrates another example embodiment of an optical transmitter 402 configured to perform complementary power modulation of supervisory data 416 in the optical domain, arranged in accordance with at least some embodiments of the present disclosure. The optical transmitter 402 of FIG. 4 may be similar to the optical transmitter 202 described above and may include a laser 406, a splitter (SP) 408, IQ modulators 410 and 411, a half-wave plate 413 and a PBC 414 substantially similar in operation and arrangement as the laser 206, the splitter 208, the IQ modulators 210 and 211, the half-wave plate 213, and the PBC 214, respectively, as described above with respect to FIG. 2. Additionally, the optical transmitter 402 is described in the context of DP-QPSK modulation. However the implementation of complementary power modulation described may apply to any applicable optical transmitter configured to perform any applicable polarization multiplexed or dual-polarization modulation.

Additionally, as described below, the optical transmitter 402 may be configured to perform complementary power modulation of supervisory data 416 in the optical domain and not the electrical domain. In the illustrated embodiment, the optical transmitter 402 may be configured to modulate supervisory data 416 (similar to the supervisory data 216 and 316 of FIGS. 2 and 3, respectively) onto the optical signal after combination by the PBC 414 of the X and Y polarization signals into an optical signal having X and Y polarization components that may respectively include the X and Y polarization signals. In contrast, as explained above, the optical transmitter 302 of FIG. 3 may be configured to modulate the supervisory data 316 onto each of the X and Y polarization signals before combination of the X and Y polarization signals by the PBC 314 of the optical transmitter 302 of FIG. 3.

In the illustrated embodiment of FIG. 4, optical transmitter 402 may include an X-polarization amplitude modulator (X-Pol. AM) 415a and a Y-polarization amplitude modulator (Y-pol. AM) 415b. The X-polarization amplitude modulator 415a and the Y-polarization amplitude modulator 415b may be included with or separate from the optical transmitter 402. The X-polarization amplitude modulator and the Y-polarization amplitude modulator may be configured to receive the optical signal from the PBC 414.

The X-polarization amplitude modulator 415a and the Y-polarization amplitude modulator 415b may be configured to receive supervisory data 416 and modulate supervisory data 416 onto the optical signal received from the PBC 414 by adjusting the power (i.e., amplitude) of the X and Y polarization components, respectively of the optical signal. Similarly to amplitude modulators 315a and 315b described above with respect to FIG. 3, the X-polarization amplitude modulator 415a and the Y-polarization amplitude modulator 415b may be configured such that when modulating supervisory data 416 onto the optical signal, an increase in the power of one polarization component may be complemented by a substantially equal decrease in the power of the other polarization component. Accordingly, the optical signal may include the supervisory data 416 while the overall power of the optical signal leaving the optical transmitter 402 may also be substantially constant.

Similarly as described above with respect to the supervisory data 216 and 316 of FIGS. 2 and 3, respectively, the modulation rate of the supervisory data 416 may be substantially slower than the modulation rate of the main data 418. Additionally, the modulation depth of the supervisory data may be sufficiently small such that the main data may not be substantially affected. Therefore, the transmission of the supervisory data 416 on the optical signal may cause little to no interference with the transmission of the main data 418 on the optical signal.

Modifications, additions, or omissions may be made to FIG. 4 without departing from the scope of the present disclosure. For example, the optical transmitter 402 may include other components not expressly shown (e.g., a processing unit configured to control various operations of the optical transmitter 402). Additionally, although described in the context of performing DP-QPSK modulation, the optical transmitter 402 may be configured to perform complementary power modulation on any suitable polarization multiplexed or dual-polarization optical signal. Further, in some embodiments, the Y-polarization amplitude modulator 415b may be configured to receive the optical signal from the PBC 414 before the X-polarization amplitude modulator 415a. In yet other embodiments, the X-polarization amplitude modulator 415a and the Y-polarization modulator 415b may be configured to perform the modulation at the same time.

Figure 5:
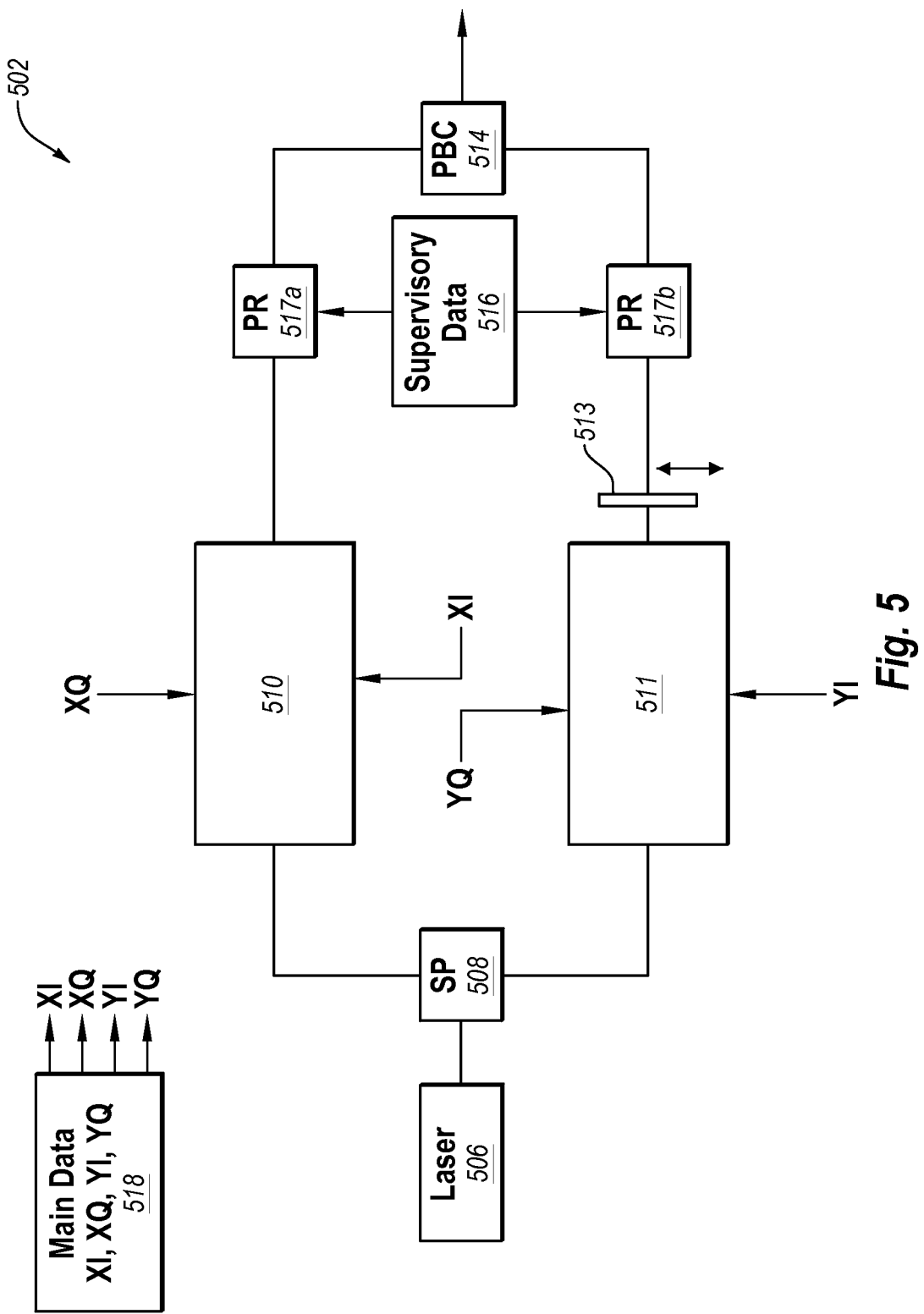
FIG. 5 illustrates another example embodiment of an optical transmitter configured to perform complementary power modulation in the optical domain.

FIG. 5 illustrates another example embodiment of an optical transmitter 502 configured to perform complementary power modulation of supervisory data 516 in the optical domain, arranged in accordance with at least some embodiments of the present disclosure. The optical transmitter 502 of FIG. 5 may be similar to the optical transmitter 202 described above and may include a laser 506, a splitter (SP) 508, IQ modulators 510 and 511, a half-wave plate 513 and a PBC 514 substantially similar in operation and arrangement as the laser 206, the splitter 208, the IQ modulators 210 and 211, the half-wave plate 213, and the PBC 214, respectively, as described above with respect to FIG. 2.

Additionally, the optical transmitter 502 may be configured to perform complementary power modulation of supervisory data 516 in the optical domain and not the electrical domain. However, the optical transmitter 502 may be configured to perform the complementary power modulation using polarization rotators 517a and 517b instead of amplitude modulators such as the amplitude modulators 315a and 315b of FIG. 3 and the X-polarization amplitude modulator 415a and the Y-polarization amplitude modulator 415b of FIG. 4.

The polarization rotator 517a may be configured to receive from the IQ modulator 510 the X-polarization signal modulated with X-polarization data (e.g., XI, XQ) of the main data 518. Similarly, the polarization rotator 511b may be configured to receive from the IQ modulator 511 and the half-wave plate 513 the Y-polarization signal modulated with Y-polarization data (e.g., Yi, and YQ) of the main data 518.

The polarization rotators 517a and 517b may be configured to adjust the power of the X and Y polarization signals of the optical signal transmitted by the optical transmitter 502 by rotating the polarization orientation of the X and Y polarization signals, respectively. A rotated polarization signal may lose power as it is combined by PBC 514 such that the associated polarization component of the combined optical signal may have lower power than the polarization component of the optical signal that may not include a polarization signal with a rotated polarization orientation. Therefore, the polarization rotators 517a and 517b may modulate the supervisory data 516 onto the optical signal transmitted by optical transmitter 502 by rotating the polarization orientations of the X and/or Y polarization signals, respectively, based on the supervisory data 516. Additionally, polarization rotators 517a and 517b may be configured to perform the rotation such that an increase in the power of the X-polarization may correspond with a substantially equal decrease in the power of the Y-polarization and vice versa. Accordingly, the overall power of the optical signal leaving the optical transmitter 502 may be substantially constant, even though the power of respective polarization signals may change.

Similarly as described above with respect to the supervisory data 216, 316 and 416, the modulation rate of the supervisory data 516 may be substantially slower than the modulation rate of the main data 518. Additionally, the modulation depth of the supervisory data may be sufficiently small such that the main data may not be substantially affected. Therefore, the transmission of supervisory data 516 on the optical signal may cause little to no interference with the transmission of the main data 518 on the optical signal.

Modifications, additions, or omissions may be made to FIG. 5 without departing from the scope of the present disclosure. For example, the optical transmitter 502 may include other components not expressly shown (e.g., a processing unit configured to control various operations of the optical transmitter 502). Additionally, although described in the context of performing DP-QPSK modulation, the optical transmitter 502 may be configured to perform complementary power modulation on any suitable polarization multiplexed or dual-polarization optical signal.

Figure 6:
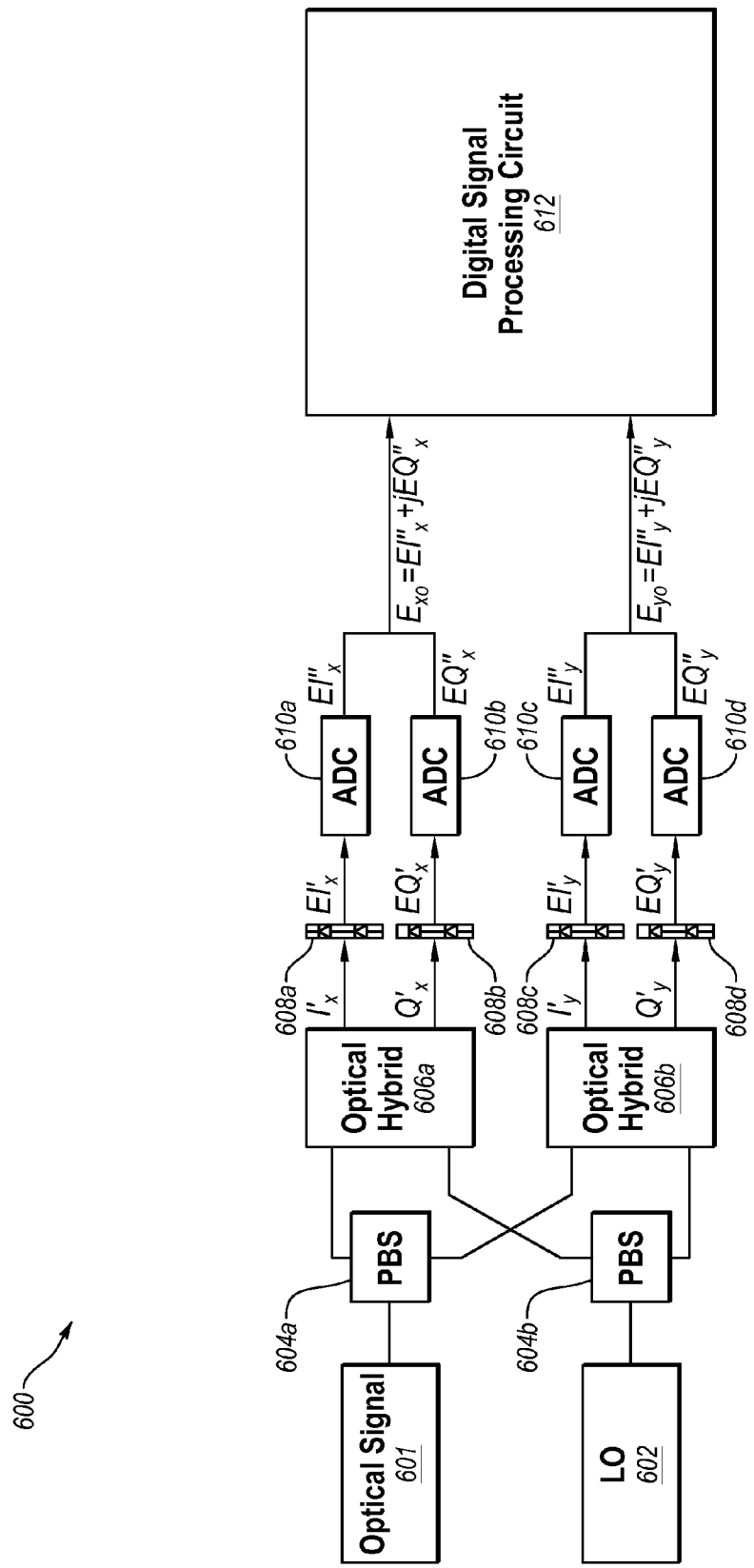
FIG. 6 illustrates an example embodiment of a coherent optical receiver configured to demodulate supervisory data from an optical signal.

As mentioned above, nodes of an optical network such as the nodes 102 of the optical network 100 of FIG. 1 may also include optical receivers configured to extract (e.g., demodulate) supervisory data from an optical signal that has been modulated using complementary power modulation, FIG. 6 illustrates an example embodiment of a coherent optical receiver 600 configured to demodulate supervisory data from an optical signal, arranged in accordance with at least some embodiments of the present disclosure. The illustrated embodiment of the coherent optical receiver 600 is configured to perform demodulation of a DP-QPSK optical signal. However, the same principles for performing demodulation of supervisory data from an optical signal may be applied with respect to any applicable coherent optical receiver configured to perform demodulation of a polarization multiplexed or dual-polarization optical signal.

The coherent optical receiver 600 may include a PBS 604a configured to receive an optical signal 601 and to split the optical signal according to its orthogonal X' and Y' polarization components to separate the respective X' and Y' polarization signals from the optical signal. The prime symbol (') indicates that the actual polarization orientation of the X' and Y' polarization signals received at the optical receiver 600 with respect to the X and Y polarization signals emitted by a transmitter may be different due to polarization rotation of the optical signal in optical fiber transmission lines of the optical network.

The PBS 604a may direct the X'-polarization signal toward an optical hybrid 606a and may direct the Y'-polarization signal toward an optical hybrid 606b. The coherent optical receiver 600 may also include a local oscillator (LO) 602 configured to generate a reference signal. A PBS 604b may be optically coupled to the local oscillator 602 and may be configured to receive the reference signal and to split the reference signal into orthogonal X' and Y' polarization components of the reference signal. The PBS 604b may direct the X'-polarization component of the reference signal toward the optical hybrid 606a and may direct the Y'-polarization component of the reference signal toward the optical hybrid 606b.

The optical hybrid 606a may be configured to mix the X'-polarization component of the reference signal with each of the I and Q channel signals included with the X'-polarization signal of the optical signal to generate mixed X'-polarization I and Q channel signals ($I_x'$ and $Q_x'$). The optical hybrid 606a may direct $I_x'$ and $Q_x'$ to balanced detectors 608a and 608b, respectively. Similarly, the optical hybrid 606b may be configured to mix the Y'-polarization component of the reference signal with the I and Q channel signals of the Y'-polarization signal of the optical signal to generate mixed Y'-polarization I and Q channel signals ($I_y'$ and $Q_y'$). The optical hybrid 606b may direct $I_y'$ and $Q_y'$ to balanced detectors 608c and 608d, respectively.

Each of the balanced detectors 608a-608d may include any suitable system, apparatus, or device, configured to convert $I_x'$, $Q_x'$ $I_y'$, and $Q_y'$ respectively, into electrical signals ($EI_x'$, $EQ_x'$, $H_y'$, and $EQ_y'$, respectively) associated with the different X' and Y' polarization I and Q channel optical signals. For example, each of the balanced detectors 608a-608d may include photodiodes configured to receive optical signals and to generate electrical signals based on the received optical signals.

The coherent optical receiver 600 may also include analog-to-digital converters (ADCs) 610a-610d communicatively coupled to balanced detectors 608a-608d, respectively. Each of the ADCs 610a-610d may include any suitable system, apparatus, or device configured to convert electrical signals $EI_x'$, $EQ_x'$, $H_y'$, and $EQ_y'$ (all of which may be analog signals), respectively, generated by the balanced detectors 608a-608d, respectively, into digital signals $EI_x''$, $EQ_x''$, $EI_y''$, and $EQ_y''$, respectively.

The coherent optical receiver 600 may combine $EI_x''$ and $EQ_x''$ to generate an X-polarization electrical signal $E_{xo}$ that may be expressed by the following equation:

$$E_{xo}=EI_x''+jEQ_x''.$$

Similarly, the coherent optical receiver 600 may combine $EI_y'$ and $EQ_y'$ to generate a Y-polarization electrical signal $E_{yo}$ that may be expressed by the following equation:

$$E_{yo}=EI_y'+jEQ_y'.$$

$E_{xo}$ and $E_{yo}$ may each be received by a digital signal processing (DSP) circuit 612 that may be configured to extract supervisory data encoded in $E_{xo}$ and $E_{yo}$ based on complementary power modulation described above.

For example, the DSP circuit 612 may extract supervisory data modulated using a complementary power modulation scheme by calculating a Stokes vector from a Jones vector E(k) including $E_{xo}$ and $E_{yo}$ to determine horizontal and vertical (horizontal/vertical) polarization components, plus and minus (+/−) forty-five degree (π/4) polarization components and left and right (left/right) circular polarization components of the optical signal 601. The DSP circuit 612 may determine a difference between the power of the horizontal/vertical polarization components, a difference between the power of the +/−forty-five degree polarization components, and/or a difference between the power of the left/right circular polarization components. As discussed below, at least one of the power differences between the different polarization components (e.g., horizontal/vertical, +/−forty-five degrees, and left/right circular) may indicate the difference in power associated with the X' and Y' polarizations of the optical signal 601. As mentioned above, in complementary power modulation of supervisory data, the relative power between the X' and Y' polarizations may vary according to the supervisory data. Therefore, at least one of the power differences between the different polarization components (e.g., horizontal/vertical, +/−forty-five degrees, and left/right circular) may indicate the supervisory data modulated on the X' and Y' polarizations of the optical signal 601.

Alternately or additionally, the DSP circuit 612 may average the power differences between the different polarization components over a period of time (e.g., the symbol period of the supervisory data) such that the measured power differences may represent the complementary power modulation of the supervisory data. Additionally, such an averaging may help filter out random power fluctuations due to factors such as noise such that the supervisory data may be more accurately extracted.

The DSP circuit 612 may determine the power differences between the different polarization components of the optical signal 601 (e.g., horizontal/vertical, +/−forty-five degrees, and left/right circular) to account for possible rotation of the polarization orientation of the modulated X' and Y' polarizations of the optical signal 601 during propagation of the optical signal 601 throughout an associated optical network. For example, in some instances the X' and Y' polarizations may rotate during transmission through the optical network such that the X' and Y' polarizations may be respectively substantially horizontally and vertically oriented at the coherent optical receiver 600. In other instances, the X' and Y' polarizations may rotate during transmission through the optical network such that the X' and Y' polarizations may be more oriented in the plus and minus forty-five degree directions at the coherent optical receiver 600. In yet other instances, the X' and Y' polarizations may rotate during transmission through the optical network such that they may be circularly polarized at the coherent optical receiver 600.

Accordingly, the difference in power between at least one of the horizontal/vertical polarization components, the +/−forty-five degree polarization components, and the left/right circular polarization components may indicate the difference in power between the X' and Y' polarizations of the optical signal 601 depending on the orientation of the X' and Y' polarizations. As such, the DSP circuit 612 may extract the supervisory data modulated on the optical signal 601 using complementary power modulation by detecting the varying power of the X' and Y' polarizations as indicated by the difference in power in at least one of the horizontal/vertical polarization components, the +/−forty-five degree polarization components and the left/right circular polarization components.

In some embodiments, the DSP circuit 612 may sum the power differences between the horizontal/vertical polarization components, the +/−forty-five degree polarization components, and the left/right circular polarization components to determine the power differences between the X' and Y' polarizations of the optical signal 601. In such embodiments, the DSP circuit 612 may adjust the weighting factors applied to the power differences between the horizontal/vertical polarization components, the +/−forty-five degree polarization components, and the left/right circular polarization components during the summing to better represent the orientation of the X' and Y' polarizations of the optical signal 601. Therefore, the power difference between the X' and Y' polarizations may be more accurately determined. In some embodiments, the weighting factors may be determined based on an eye opening associated with the optical signal 601 where the eye opening may improve as the weighting factors more accurately indicate the orientation of the X' and Y' polarizations of the optical signal 601. Additionally, these weighting factors may be updated regularly to compensate for the random drift of polarization of the optical signal during transmission due to environmental perturbations.

Therefore, in some embodiments of the present disclosure, the DSP circuit 612 may be configured to perform demodulation of complementary power modulation of X' and Y' polarizations of the optical signal 601 by using a Jones vector E(k) to determine the average power differences between the horizontal/vertical polarization components, the +/−forty-five degree polarization components, and the left/right circular polarization components. In alternative embodiments of the present disclosure, the DSP circuit 612 may be configured to perform demodulation of the complementary power modulation of X' and Y' polarizations of the optical signal 601 through a polarization dependent loss (PDL) analysis, as described below.

PDL generally occurs when one polarization (e.g., the X-polarization) of an optical signal experiences more loss than another polarization (e.g., the Y-polarization) of the optical signal such that the power between the different polarizations is not equal. Accordingly, complementary power modulation of the optical signal 601 may be manifested as PDL due to power differences between the X and Y polarizations of the optical signal 601 created by complementary power modulation.

The DSP circuit 612 may include an adaptive equalizer that includes an adaptive finite impulse response (FIR) filter configured to compensate for PDL through adjustments in tap coefficients of the FIR filter. The DSP circuit 612 may be configured to determine the PDL based on the FIR filter coefficients. Accordingly, the DSP circuit 612 may be configured to determine an average PDL of the optical signal 601 over a time period associated with the symbol period of the supervisory data such that the average PDL indicates the complementary power modulation of the supervisory data. Therefore, in some embodiments of the present disclosure, the DSP circuit 612 may be configured to perform demodulation of complementary power modulation of X and Y polarizations of the optical signal 601 based on PDL analysis and compensation performed by the adaptive equalizer of the DSP circuit 612.

Accordingly, as described above, the coherent optical receiver 600 may include a DSP circuit 612 configured to demodulate supervisory data modulated on the optical signal 601 with complementary power demodulation. Such a configuration may allow for demodulation of the supervisory data without incorporating additional optical components, which may reduce the cost of implementing the complementary power modulation of supervisory data.

Modifications, additions, or omissions may be made to the coherent optical receiver 600 without departing from the scope of the present disclosure. For example, the coherent optical receiver 600 is described with respect to receiving and performing operations on a DP-QPSK optical signal, however, the above principles may be applied with respect to any suitable polarization multiplexed or dual-polarization optical signal. Further, the number of components described and their operations are for exemplary purposes only. The listed components of the coherent optical receiver 600 may perform any number of other operations not specifically enumerated. Further, the coherent optical receiver 600 may include any number of additional components configured to perform any number of operations.

In some embodiments of the present disclosure, an SV detector may be configured to perform demodulation of complementary power modulation. The relatively slow modulation rate of the supervisory data may allow the SV detector to include relatively low-speed photodetectors and electronics as compared to an optical transmitter configured to receive and demodulate main data. Accordingly, the SV detector may have a relatively low implementation cost. The SV detector may be included with an optical receiver or may be a separate and independent component of the optical network.

Figure 7:
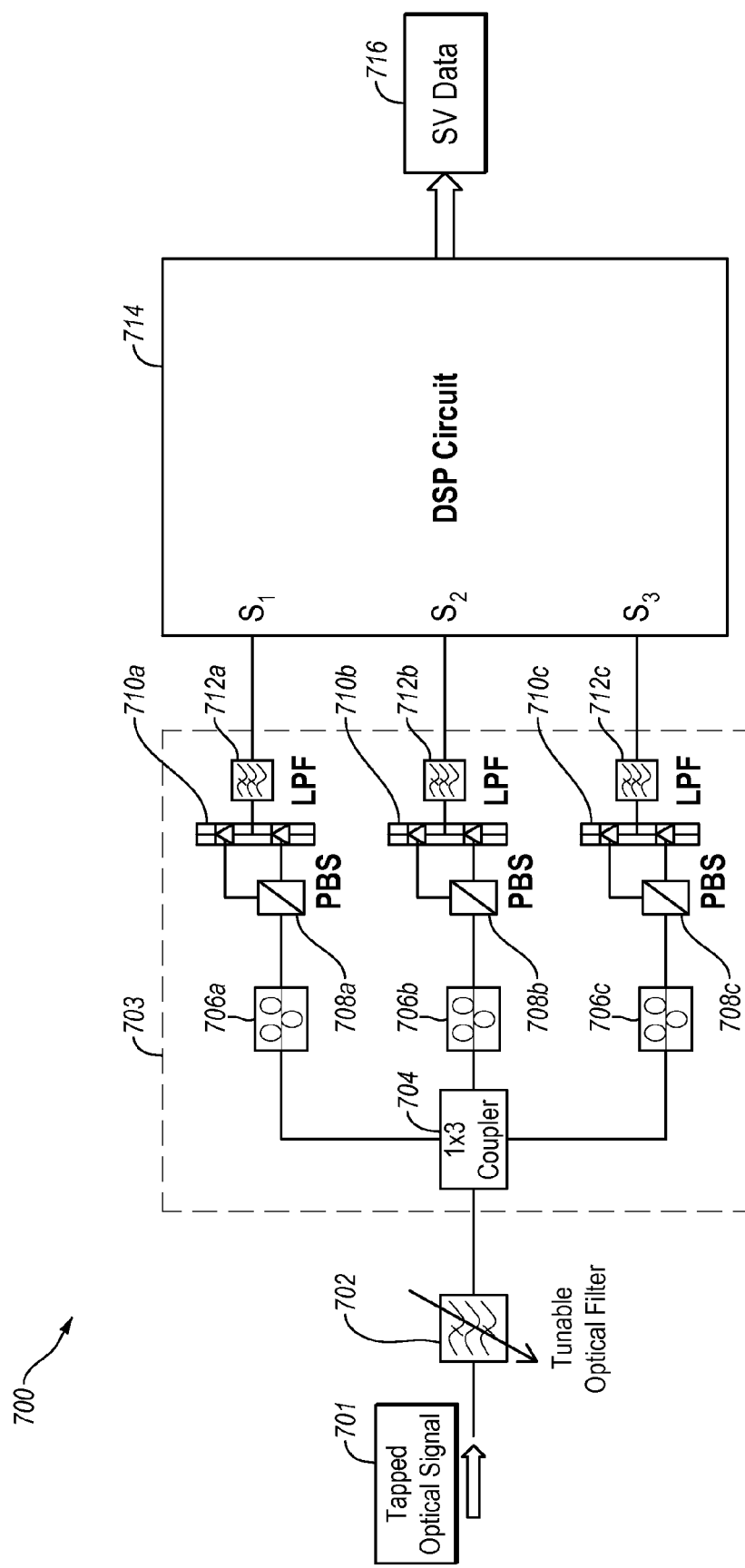
FIG. 7 illustrates an example configuration of a supervisory data detector (SV detector) configured to demodulate complementary power modulation.

FIG. 7 illustrates an example configuration of an SV detector 700 that may be configured to demodulate complementary power modulation, arranged in accordance with at least some embodiments of the present disclosure. The SV detector 700 may be configured to receive an optical signal and may tap a portion of the received optical signal to obtain a tapped optical signal 701. The SV detector 700 may be configured to direct the tapped optical signal 701 toward a tunable optical filter 702.

The tunable optical filter 702 may be tuned to the wavelength range of a channel associated with a target channel of the tapped optical signal 701 and including supervisory data (SV data) 716 encoded therein. The tunable optical filter 702 may be optically coupled to a polarimeter 703 and may be configured to direct the tapped optical signal (now filtered according to a particular channel) toward a polarimeter 703.

The polarimeter 703 may be configured to divide the tapped optical signal 701 according to its horizontal/vertical polarization components, +/−forty-five degree polarization components, and left/right circular polarization components in the optical domain, analogous to the description of determining the Stokes vector from the Jones vector E(k) representing the optical signal 601 of FIG. 6 into representative horizontal/vertical polarization components, +/−forty-five degree polarization components, and left/right circular polarization components in the electrical domain.

For example, the polarimeter 703 may include a 1×3 coupler 704 configured to receive the tapped optical signal 703 from the tunable optical filter 702 and to split the tapped optical signal 703 into three signals. The polarimeter 703 may direct one of the three optical signals toward a polarization controller 706*a*, a PBS 708*a*, a detector 710*a* and a low-pass filter (LPF) 712*a* configured to detect the horizontal/vertical polarization components of the tapped optical signal 701 and to generate electrical signals representing the horizontal and vertical polarization components of the tapped optical signal 701. A polarization controller 706*b*, a PBS 708*b*, a detector 710*b* and an LPF 712*b* may be analogously configured to receive another of the three optical signals split from the tapped optical signal 701 to detect the +/−forty-five degree polarization components of the tapped optical signal 701 and to generate electrical signals representing the plus and minus forty-five degree polarization components. Additionally, a polarization controller 706*c*, a PBS 708*c*, a detector 710*c* and an LPF 712*c* may be analogously configured to receive the other of the three optical signals split from the tapped optical signal 701 to detect the left/right circular polarization components of the tapped optical signal 701 and to generate electrical signals representing the left and right circular polarization components.

A signal processing circuit 714 (depicted as a DSP circuit in FIG. 7) of the SV detector 700 may be configured to receive the electrical signals representing the horizontal/vertical polarization components, the +/−forty-five degree polarization components, and the left/right circular polarization components from the polarimeter. The signal processing circuit 714 may be configured to determine a difference between the power of the horizontal/vertical polarization components, a difference between the power of the +/−forty-five degree polarization components, and/or a difference between the power of the left/right circular polarization components as received from the polarimeter 703.

As discussed above with respect to FIG. 6, at least one of the power differences between the different polarization components (e.g., horizontal/vertical, +/−forty-five degrees, and left/right circular) may indicate the difference in power associated with the X' and Y' polarizations of the tapped optical signal 701. Additionally, as mentioned above, in complementary power modulation of supervisory data, the relative power between the X' and Y' polarizations may vary according to the supervisory data. Therefore, at least one of the power differences between the different polarization components may indicate the supervisory data (SV data) 716 modulated onto the X' and Y' polarizations of the tapped optical signal 701.

Additionally, and similar to the DSP circuit 612 of FIG. 6, in some embodiments the signal processing circuit 714 may sum the power differences between the horizontal/vertical, +/−forty-five degree, and left/right circular polarization components to determine the power differences between the X and Y polarizations of the tapped optical signal 701. In such embodiments, the signal processing circuit 714 may adjust the weighting factors applied to the power differences between the horizontal/vertical polarization components, +/−forty-five degree polarization components, and left/right circular polarization components during summing to better represent the orientation of the X and Y polarizations of the tapped optical signal 701 such that the power difference between the X and Y polarizations may be more accurately determined. In some embodiments, the weighting factors may be determined based on an eye opening associated with the tapped optical signal 701 where the eye opening may improve as the weighting factors more accurately indicate the orientation of the X and Y polarizations of the optical signal 701. Additionally, these weighting factors may be updated regularly to compensate for the random drift of polarization of the optical signal during transmission due to environmental perturbations Therefore, in some embodiments of the present disclosure, the SV detector 700 may include the tunable optical filter 702, the polarimeter 703 and the signal processing circuit 714 configured to perform demodulation of complementary power modulation of X' and Y' polarizations of the tapped optical signal 701. The SV detector 700 may perform such demodulation by separating different polarization components of the tapped optical signal 701 and determining the average power differences between horizontal/vertical polarization components, +/−forty-five degree polarization components, and left/right circular polarization components to determine the power difference between the X' and Y' polarizations of the tapped optical signal 701.

Modifications, additions, or omissions may be made to the SV detector 700 of FIG. 7 without departing from the scope of the present disclosure. For example, although the detectors 710a-710c are depicted as balanced detectors, in other embodiments one or more of the detectors 710a-710c may be single ended detectors. Additionally, the SV detector 700 may include other components configured to perform other operations than those explicitly described.

Figure 8:
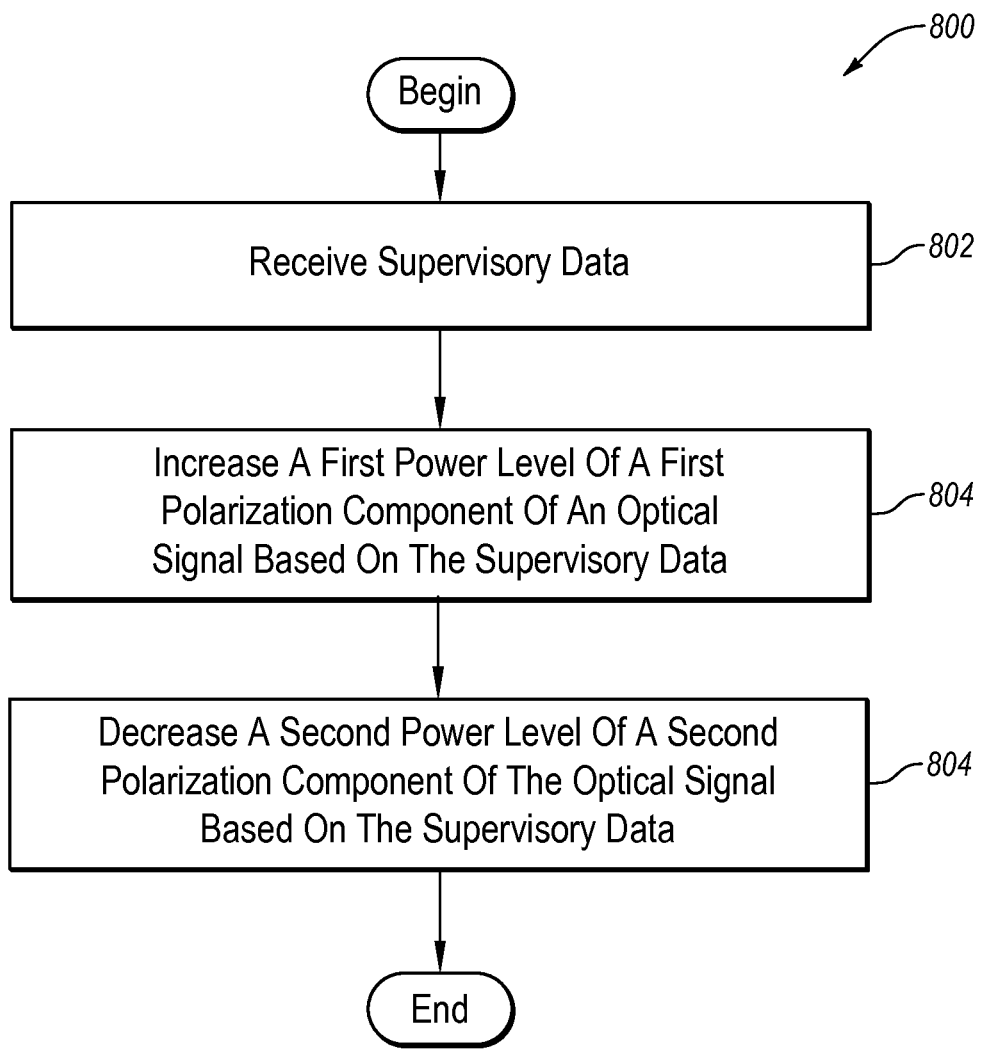
FIG. 8 is a flow chart of an example method of modulating supervisory data onto an optical signal, all arranged in accordance with some embodiments of the present disclosure.

FIG. 8 is a flow chart of an example method 800 of modulating supervisory data onto an optical signal, arranged in accordance with at least some embodiments of the present disclosure. The method 800 may be implemented by any suitable component of an optical network such as any one of the optical transmitters 202, 302, 402, and 502, described above. Although illustrated as discrete steps, various steps of the method 800 may be divided into additional steps, combined into fewer steps, or eliminated, depending on the desired implementation. Additionally, the order of performance of the different steps may vary depending on the desired implementation.

The method 800 may begin at step 802, where an optical transmitter may receive supervisory data that is to be modulated onto an optical signal. At step 804, the optical transmitter may increase a first power level of a first polarization component of the optical signal based on the supervisory data. For example, the optical transmitter may increase a power level of an X-polarization component of the optical signal or a Y-polarization component of the optical signal.

At step 806, the optical transmitter may decrease a second power level of a second polarization component of the optical signal based on the supervisory data. The decrease of the second power level may be substantially the same as the increase of the first power level such that a total power of the optical signal may be substantially constant. For example, if the power level of the X-polarization component is increased at step 804, the power level of the Y-polarization component may be decreased at step 806 by the substantially same amount as in the increase in power of the X-polarization component as described above with respect to FIG. 1B. Following step 806, the method 800 may end. Therefore, the method 800 may be implemented for modulating supervisory data on an optical signal through complementary power modulation.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 800 may further include operations performed by one or more optical receivers for demodulating the supervisory data from the optical signal. Further, the modulation described may be performed in the optical or electrical domain depending on the desired implementation of the method 800.

Further, the embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the disclosure.

What is claimed is:

1. A method of modulating supervisory data onto an optical signal, the method comprising:
   increasing a first power level of a first polarization component of an optical signal based on supervisory data; and
   decreasing a second power level of a second polarization component of the optical signal based on the supervisory data as a function of the increasing of the first power level such that the decreasing of the second power level is substantially the same as the increasing of the first power level and such that the supervisory data is modulated based on both the increase in the first power level of the first polarization component and the substantially same decrease in the second power level of the second polarization component.

2. The method of claim 1, further comprising performing operations in an electrical domain to increase the first power level of the first polarization component of the optical signal and to decrease the second power level of the second polarization component of the optical signal.

3. The method of claim 1, further comprising performing operations in an optical domain to increase the first power level of the first polarization component of the optical signal and to decrease the second power level of the second polarization component of the optical signal.

4. The method of claim 3, further comprising rotating at least one of the first polarization component and the second polarization component based on the supervisory data prior to combination of the first polarization component and the second polarization component into the optical signal by a polarization beam combiner (PBC) such that the first power level of the first polarization component is increased and the second power level of the second polarization component is decreased by the PBC based on the rotation of at least one of the first polarization component and the second polarization component.

5. The method of claim 1, further comprising demodulating the supervisory data from the optical signal using a coherent optical receiver.

6. The method of claim 1, further comprising demodulating the supervisory data from the optical signal using a tunable filter, a polarimeter, and a signal processor of a supervisory data detector.

7. The method of claim 1, further comprising demodulating the supervisory data from the optical signal based on a Jones vector.

8. The method of claim 1, further comprising demodulating the supervisory data from the optical signal based on a polarization dependent loss (PDL) analysis of the optical signal.

9. A system of modulating supervisory data onto an optical signal, the system comprising:
   an optical transmitter configured to:
      receive supervisory data;
      increase a first power level of a first polarization component of an optical signal based on the supervisory data;
      decrease a second power level of a second polarization component of the optical signal based on the supervisory data as a function of the increase of the first power level such that the decrease of the second power level is substantially the same as the increase of the first power level and such that the supervisory data is modulated based on both the increase in the first power level of the first polarization component and the substantially same decrease in the second power level of the second polarization component; and
      emit the optical signal.

10. The system of claim 9, wherein the optical transmitter is further configured to perform operations in an electrical domain to increase the first power level of the first polarization component of the optical signal and to decrease the second power level of the second polarization component of the optical signal.

11. The system of claim 9, wherein the optical transmitter is further configured to perform operations in an optical domain to increase the first power level of the first polarization component of the optical signal and to decrease the second power level of the second polarization component of the optical signal.

12. The system of claim 11, wherein the optical transmitter comprises:
   a first amplitude modulator configured to increase the first power level of the first polarization component based on the supervisory data; and
   a second amplitude modulator configured to decrease the second power level of the second polarization component based on the supervisory data.

13. The system of claim 11, wherein the optical transmitter comprises:
   a polarization beam combiner (PBC) configured to combine the first polarization component and the second polarization component into the optical signal; and
   a first polarization rotator and a second polarization rotator optically coupled to the PBC and configured to rotate at least one of the first polarization component and the second polarization component based on the supervisory data prior to combination of the first polarization component and the second polarization component into the optical signal by the PBC such that the first power level of the first polarization component is increased and the second power level of the second polarization component is decreased by the PBC based on the rotation of at least one of the first polarization component and the second polarization component.

14. The system of claim 9, further comprising an optical receiver optically coupled to the optical transmitter and configured to:
   receive the optical signal; and
   demodulate the supervisory data from the optical signal.

15. The system of claim 14, wherein the optical receiver comprises a coherent optical receiver configured to demodulate the supervisory data from the optical signal.

16. The system of claim 9, further comprising a supervisory data detector optically coupled to the optical transmitter and configured to:
   receive the optical signal; and demodulate the supervisory data from the optical signal using a tunable filter, a polarimeter, and a signal processor.

17. The system of claim 14, wherein the optical receiver is configured to demodulate the supervisory data from the optical signal based on a Jones vector.

18. The system of claim 14, wherein the optical receiver is configured to demodulate the supervisory data from the optical signal based on a polarization dependent loss (PDL) analysis.

19. A processor configured to execute computer instructions to cause a system to perform operations for modulating supervisory data onto an optical signal, the operations comprising:
   increasing a first power level of a first polarization component of an optical signal based on supervisory data; and
   decreasing a second power level of a second polarization component of the optical signal based on the supervisory data as a function of the increasing of the first power level such that the decreasing of the second power level is substantially the same as the increasing of the first power level and such that the supervisory data is modulated based on both the increase in the first power level of the first polarization component and the substantially same decrease in the second power level of the second polarization component.

20. The processor of claim 19, wherein the operations comprise performing operations in an electrical domain to increase the first power level of the first polarization component of the optical signal and to decrease the second power level of the second polarization component of the optical signal.

\* \* \* \* \*